United States Patent [19]
Wipasuramonton et al.

[11] Patent Number: 6,059,311
[45] Date of Patent: May 9, 2000

[54] PILLAR-MOUNTED SIDE IMPACT AND ROLLOVER AIR BAG

[75] Inventors: Pongdet P. Wipasuramonton, Rochester; Robert Tobian, New Baltimore; Michael J. Lachat, Shelby; Martin Kubiak, Shelby Township, Macomb County, all of Mich.

[73] Assignee: Breed Automotive Technology, Inc., Lakeland, Ill.

[21] Appl. No.: 09/027,452

[22] Filed: Feb. 21, 1998

[51] Int. Cl.[7] .............................. B60R 21/22; B60R 21/24
[52] U.S. Cl. .................... 280/729; 280/730.2; 280/743.1
[58] Field of Search ................................. 280/730.2, 733, 280/743.1, 730.1, 743.2, 729

[56] References Cited

U.S. PATENT DOCUMENTS

| | | | |
|---|---|---|---|
| 5,161,821 | 11/1992 | Curtis | 280/730.2 |
| 5,586,782 | 12/1996 | Zimmerman, II et al. | 280/730.2 |
| 5,871,230 | 2/1999 | Lewis | 280/733 |
| 5,913,536 | 6/1999 | Brown | 280/730.2 |

FOREIGN PATENT DOCUMENTS

| | | | |
|---|---|---|---|
| 3-276844 | 12/1991 | Japan | 280/730.2 |
| 5-38993 | 2/1993 | Japan | 280/730.2 |
| 5-139232 | 6/1993 | Japan | 280/730.2 |

Primary Examiner—Peter C. English
Attorney, Agent, or Firm—Markell Seitzman

[57] ABSTRACT

A side impact crash protection and rollover system comprising: a web guide attachable to a pillar of a vehicle; a seat belt system having a shoulder belt portion supported by and extending from the web guide, the shoulder belt portion adapted to be secured about a seated occupant; an air bag assembly including an air bag initially stored in an uninflated or folded condition adjacent the web guide and when inflated is positioned adjacent the pillar, the air bag including a first channel for receiving a portion of the shoulder belt portion.

18 Claims, 11 Drawing Sheets

PILLAR-MOUNTED SIDE IMPACT AND ROLLOVER AIR BAG

BACKGROUND AND SUMMARY OF THE INVENTION

The present invention generally relates to occupant safety restraint systems and more particularly to a system designed to protect an occupant in a side impact and/or rollover accident.

The concept of providing safety systems to protect an occupant during a side impact collision or rollover accident has been proposed in the prior art. These systems include air bags that are stored within one or more of the vehicle doors and, when inflated, provide a cushion between the occupant and the side of the vehicle. Other systems deploy an air bag from a side or wing of the seat. Other systems deploy a net or air bag that is typically stored near the roof rail of the vehicle and, when pulled down, covers the window area of the door to prevent occupant egress.

It is an object of the present invention to provide an improved side impact and rollover system. It is a further object of the present invention to provide an air bag which protects the occupant in a side impact collision and also functions in cooperation with a seat belt system to tighten the seat belt about the occupant, thereby removing slack.

Accordingly the present invention comprises: a side impact crash protection and rollover system comprising: a web guide attachable to a pillar of a vehicle; a seat belt system having a shoulder belt portion supported by and extending from the web guide, the shoulder belt portion adapted to be secured about a seated occupant; an air bag assembly including an air bag initially stored in an uninflated or folded condition adjacent the web guide and when inflated is positioned adjacent the pillar, the air bag including a first channel for receiving a portion of the shoulder belt.

Many other objects and purposes of the invention will be clear from the following detailed description of the drawings.

DETAILED DESCRIPTION OF THE DRAWINGS

Figure 1:
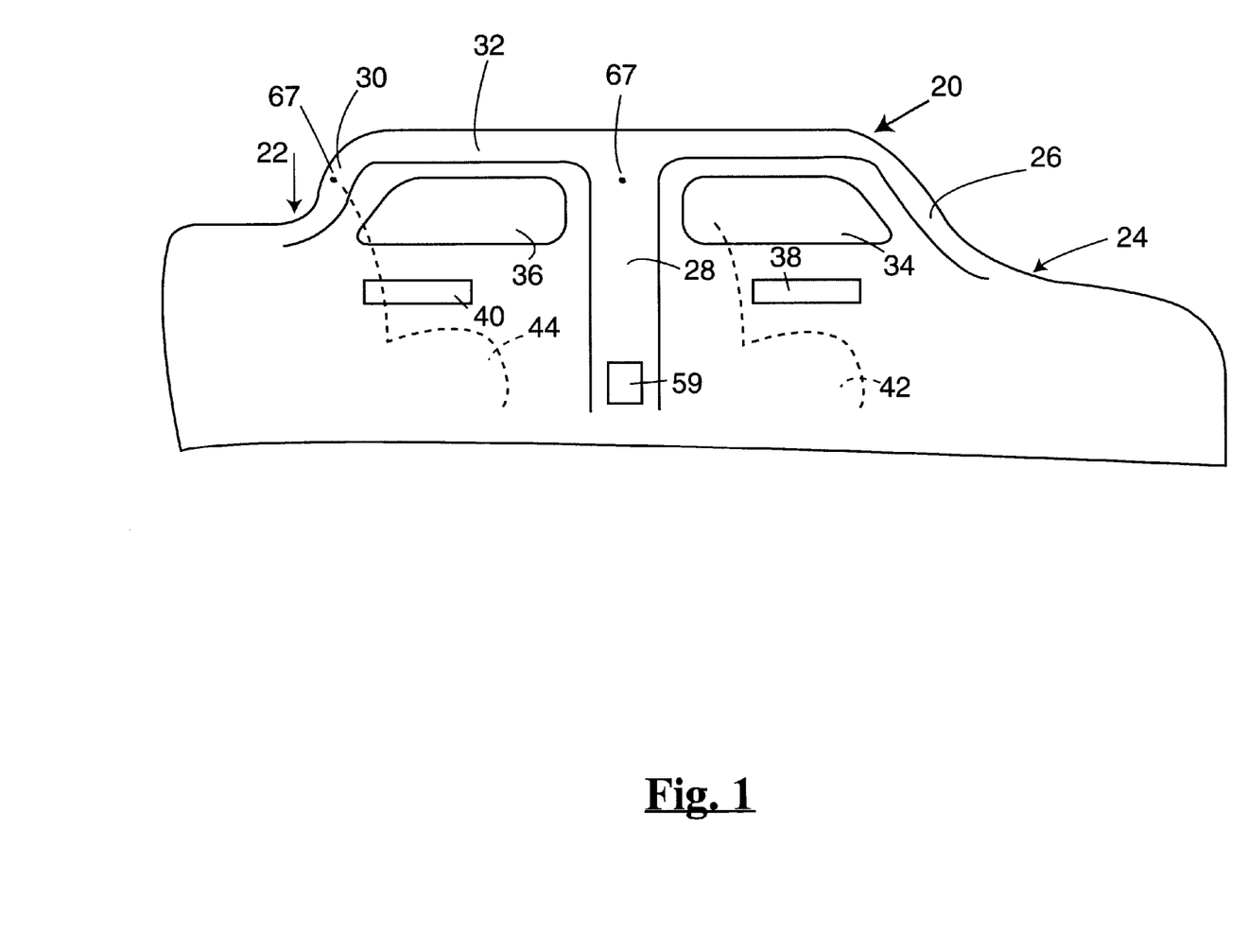
FIG. 1 diagrammatically illustrates the interior of a typical vehicle.

Reference is made to FIG. 1 which illustrates the interior of a vehicle 20 and more particularly the construction of a typical side 22 of the vehicle. The vehicle is constructed using a frame 24. The frame defines an A-pillar 26, a B-pillar 28 and a C-pillar 30. A roof rail 32 connects the various pillars. The frame 24 includes a number of other structural elements (not shown) which are known in the art. FIG. 1 shows the location of the front window 34 and rear window 36, front armrest 38, rear armrest 40, front seat 42 and rear seat 44.

Figure 7:
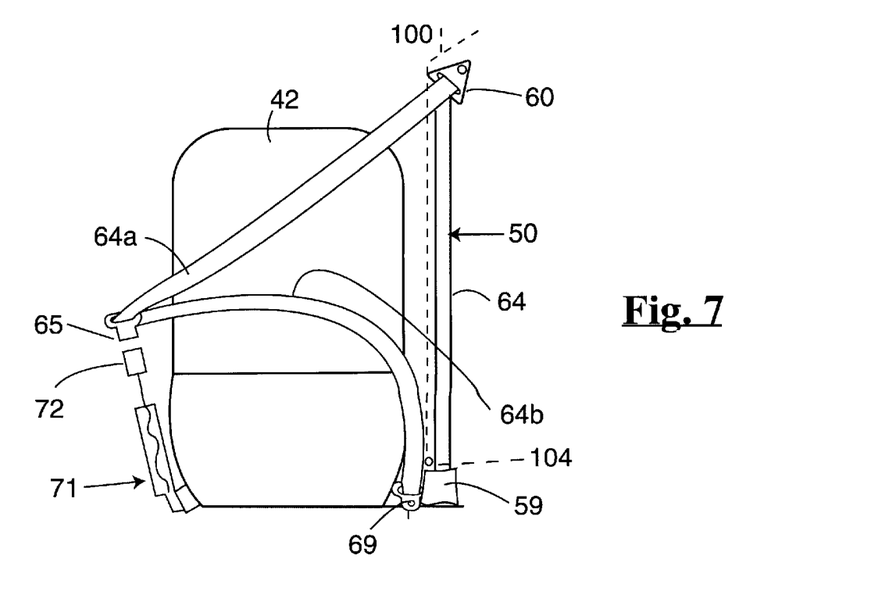
FIG. 7 shows a three-point safety restraint system.

Today's vehicles typically include a three-point safety restraint system 50 (see FIG. 7) for each outboard seating location. These systems will typically include a seat belt retractor 59, a seat belt 64 configured into a shoulder belt portion 64a and lap belt portion 64b which is anchored at 69, a tongue 65 and a buckle 72. These systems 50 may also include belt-tightening devices (also referred to as pretensioners in the art) such as a buckle pretensioner 71 and retractor pretensioner (which is typically internal to the retractor). The purpose of these pretensioners or belt-tightening devices is to remove seat belt slack during the initial moments of an accident. These three-point safety restraint systems are typically used, at least, for each of the four outboard seating positions within the vehicle. As is known in the art, the shoulder belt portion 64a of the seat belt is positioned and guided by a web guide 60 (sometimes also known as a D-ring in the art). For the driver and front passenger, the D-ring is typically located and secured to the B-pillar 28. A typical location of the web guide 60 for the front seat is shown by numeral 67 (in FIG. 1). The web guide 60a associated with the safety belt used for the rear passengers is secured to the C-pillar 30 (see FIG. 9). The front web guides 60, rather than being secured at a fixed location on the B-pillar may be part of a height adjusting mechanism (height adjuster) 66 which includes a slidable carriage 54 (to which a D-ring 60 is attached) permitting the occupant to adjust the vertical position of the web guide 60 in a known manner. A similar configuration can be used for the rear web guide.

Figure 2:
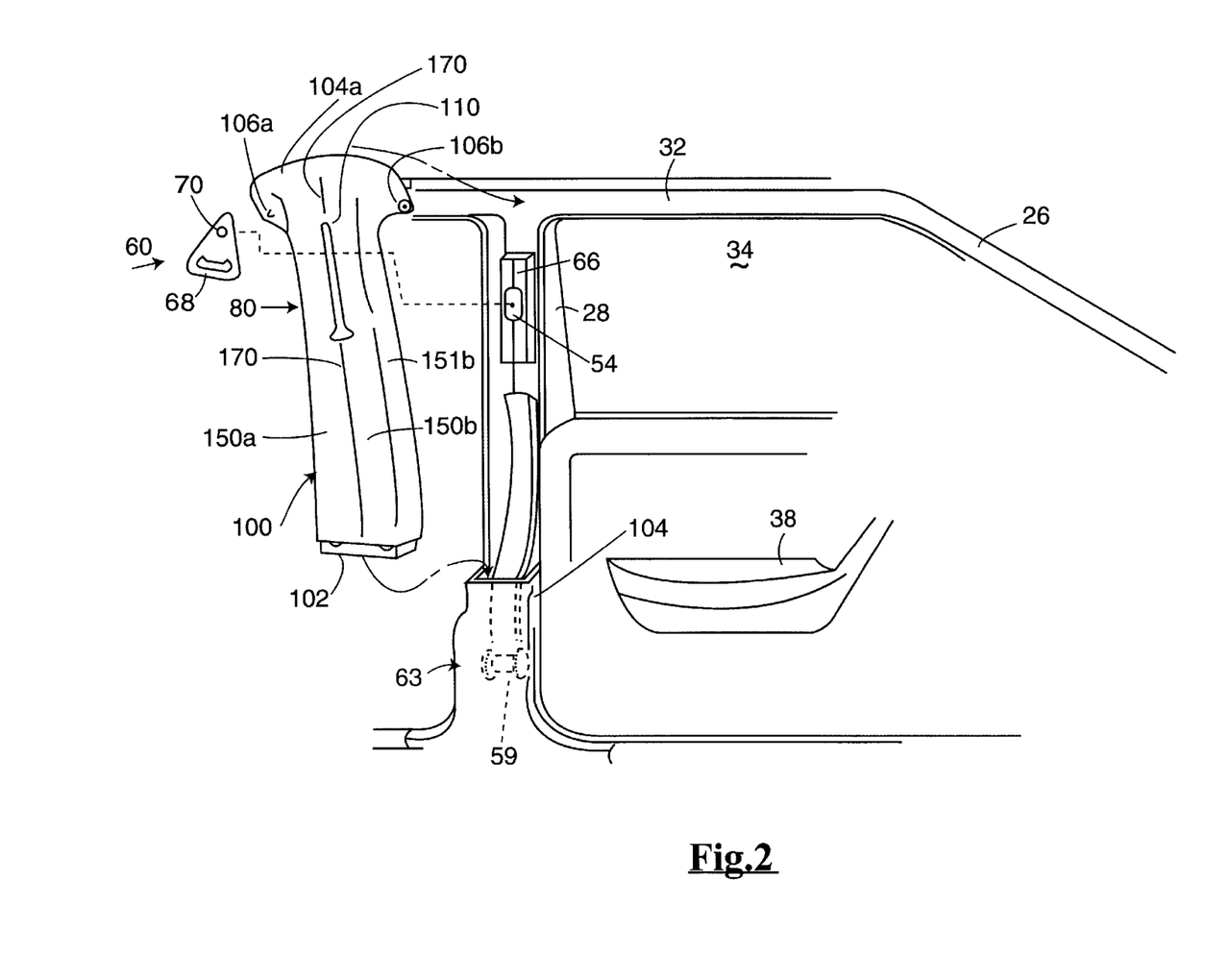
FIG. 2 illustrates a major component of the present invention in relation to the B-pillar.

Reference is now made to FIG. 2 which again illustrates the internal layout of the vehicle showing the B-pillar 28 and roof rail 32 and shows various elements of an occupant restraint system 80. An adjustable web guide mechanism 66 is shown attached to the B-pillar 28. The retractor 59 for front vehicle occupants, such as the driver, is typically attached to the floor or lower portion of the B-pillar and covered by a plastic molding 63. The shoulder belt portion 64a extends from a spool of the retractor and through a loop 68 of the D-ring 60 (which is shown in front of a housing 100). The D-ring 60 also has a mounting opening 70 for a fastener. The D-ring 66 is secured to the slidable carrier 54 or alternatively fixedly positioned at a single location 67 such as shown in FIG. 1.

The housing 100 (of FIG. 2) also provides a decorative fascia to cover height adjuster 66 and B-pillar 28. The housing 100 includes a lower flange 102 that fits within a mating opening of the top 104 of the trim 63. This flange 102 can be fixedly secured to the trim 63 in a known manner such as using interlocking tongues or grooves on each of the housing and trim 63. The upper portion 104a of the housing includes fastener openings 106a and 106b which facilitate attachment of the housing to the roof rail 32. During assembly of the housing 100 to the B-pillar 28, the D-ring 60 (and the seat belt 64, tongue 65 and anchor 69) are slipped through an opening 110 in the housing (from the rear of the housing to the front of the housing). Subsequently, the housing 100 is attached to the B-pillar 28 and the D-ring 60, which was temporarily positioned in front of the housing 100, is secured to the movable carrier 54 or fixed mounting location 67. In this position the D-ring 60 is in front of the housing 100 with its fastener (which joins the D-ring to its mounting point) vertically movable in the slot 110. It should be appreciated that if the D-ring 60 were attached to a fixed point on the B-pillar a smaller (circular) opening would be used. In the above construction the housing 100 hides that portion of the shoulder belt portion 64a which extends to the retractor 59.

An alternate construction permits the shoulder belt portion 64a to lie in front of the housing 100. In this case the D-ring 60 can be secured to the carriage 54 without being first routed through opening 110.

Figure 3:
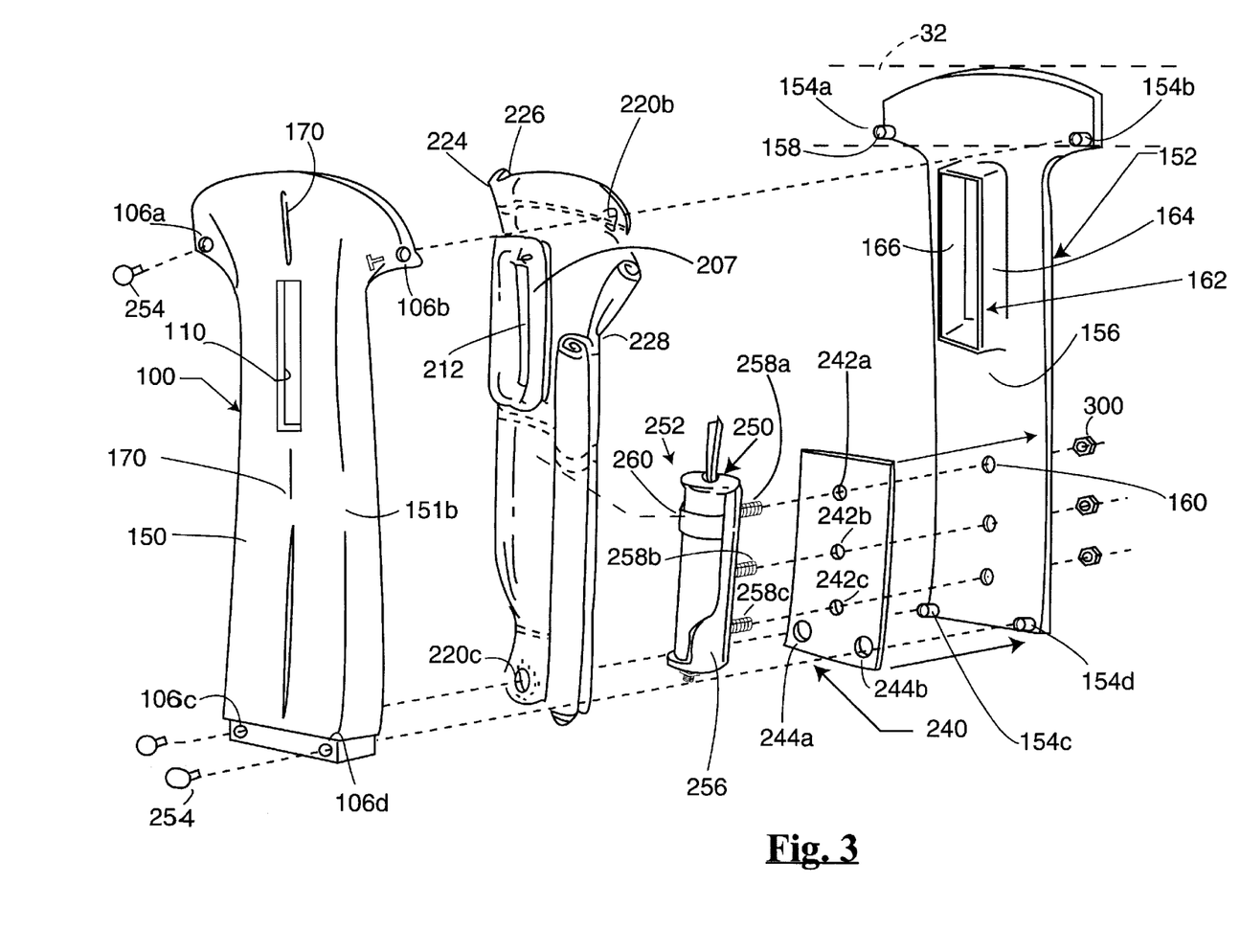
FIG. 3 is an assembly view showing the major components of the present invention.
Figure 4:
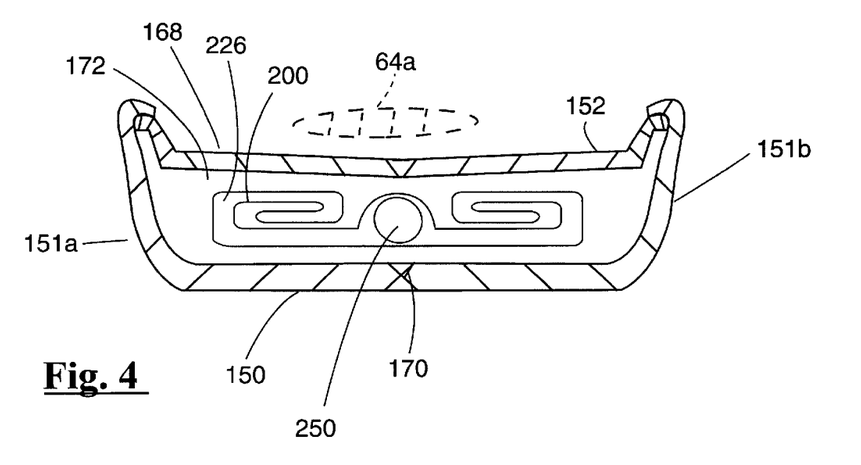
FIG. 4 is a cross section of a housing of the present invention.

Reference is made to FIGS. 3 and 4 which show the major components of the housing 100. The housing 100 is generally C-shaped and includes a front or trim panel 150 and sidewalls 151a,b which matingly engage a back plate 152. The back plate includes four mounting lugs 154a–d which extend from the main portion 156 of the back plate 152. Each of the mounting lugs 154a–d is hollow having a bore 158. A respective fastener 254 extends through the holes 106a–d (of the plate 150) through each bore to secure the housing 100 to roof rail 32 and/or the B-pillar 28. The back plate 152 also includes a plurality of inflator mounting holes 160 and an outwardly extending, hollow projection 162 having walls 164 defining an opening or channel 166 which extends through to the rear 168 of the back plate 152. When the housing 100, including the trim plate 150 and back plate 152, is mounted to the roof rail 32/B-pillar 28, the opening or channel 162 is positioned over the web guide mounting location 67 or height adjuster 66, with the opening 110 (of the trim panel 150) aligned to the opening 162 (in the back plate).

The trim plate 150 includes a tear seam 170 which extends above and below the opening 110.

The trim plate 150 and back plate 152 are designed such that when the two are mated together, they define an interior cavity 172 in which an air bag 200 and inflator 250 are located.

Figure 5:
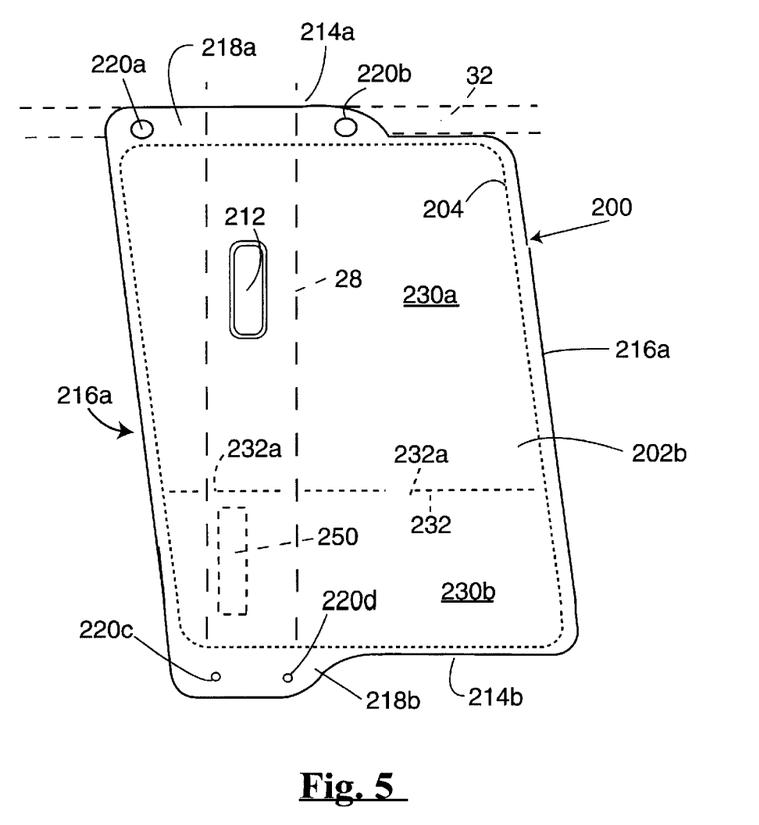
FIG. 5 is an isolated, plan view of an air bag used within the invention.
Figure 6:
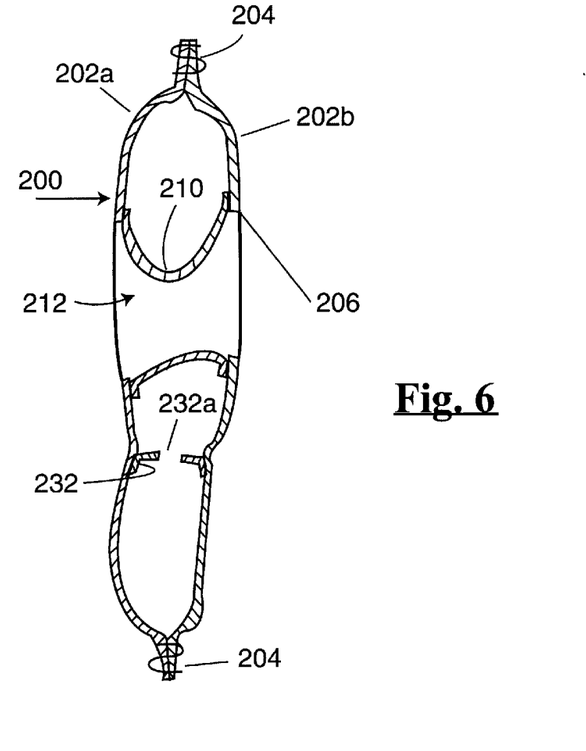
FIG. 6 is a cross sectional view of an air bag near a slot of a height adjuster (also referred in the art as an adjustable turning loop).

Reference is made to FIGS. 5 and 6 which illustrate a plan view and a sectional view of the air bag 200 prior to installation within the housing 100. The air bag 200 is constructed of two facing panels of material 202a and 202b which are secured together. Numeral 204 illustrates a peripheral line of stitches used to sew the panels of material together. In one embodiment the panels 202a,b are constructed of woven, nylon material. The material may be coated with silicone to reduce the permeability of the fabric to permit the air bag 200 to remain inflated for a predetermined length of time. If it is desired that the air bag maintain its inflated shape for an extended period of time the bag 200 will typically be coated with urethane instead of silicone and each of the sewn seams replaced by a heat seal. Alternatively the air bag 200 may be made of a thermoplastic such as urethane or thin film of similar material. Each of the panels 202a and 202b includes an opening 206. A tubular section of material 210 is sewn to each of the panels proximate the openings 206 to provide a through passage 212 (which is open to atmosphere). The length of the tubular section is chosen to permit the two panels of material to separate sufficiently to provide depth to cushion the occupant's head from bottoming out and to completely cover the D-ring 60 when inflated. The tubular material 210 defines a wall of the air bag. With the two material panels 202a,b laid flat on each other, a portion of the tubular section is pulled through the opening 206 in the front panel 202a and formed into a roll 207 (see FIG. 3). As discussed below, the shoulder belt portion 64a of the seat belt 64 extends through this tubular section.

Reference is again made to FIG. 5. A pair of parallel phantom lines has been superimposed upon the air bag 200 to illustrate the positional relationship of the opening 212 to the B-pillar 28/roof rail 32 and also to illustrate the positional relationship of the inflator to the opening 212 and to the B-pillar. The air bag 200 is generally rectangular or trapezoidal in shape, having a top and bottom 214a and 214b respectively and sides 216a and 216b. The air bag 200 further includes an upper and lower border of material 218a and 218b (which lie beyond the inflatable portion of the air bag). These borders include a plurality of mounting openings 220a–220d. The air bag 200 is preferably a dual-chambered air bag having an upper chamber 230a and a lower chamber 230b. A sewn seam or rectangular or oval separator panel 232 separates the two chambers of the air bag. The panel 232 is segmented showing a plurality of air flow vents 232a which permit inflation gas to flow between the two chambers. As can be seen the inflator 250 is located in the lower chamber 230b. Upon deployment of the air bag 200, the lower chamber 230b is filled with inflation gas first and this gas is permitted to migrate into the upper chamber 230a through the vents 232a. Thus the lower chamber is generally at a higher pressure than that of the upper chamber. Once the lower chamber 230b is compressed by the occupant in a side impact or rollover crash, additional gas is controllably forced into the upper chamber at a faster rate to protect the occupant's head. Reference is again made to FIG. 3. The system 80 further includes a metal retaining plate 240 which includes a plurality of mounting openings 242a–242c and a plurality of alignment openings 244a and 244b.

Figure 13:
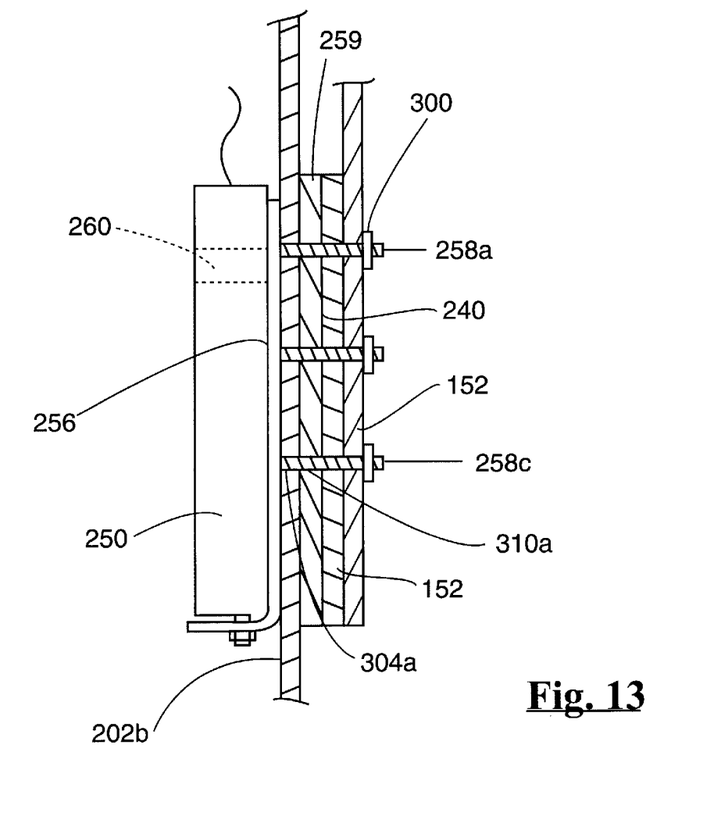
FIG. 13 is a side view of a section of an air bag showing inflator studs.

An inflator 250 is part of an inflator assembly 252 which also comprises a mounting bracket or housing 256. The mounting bracket or housing 256 includes a plurality of mounting studs 258a–258c which extend from the housing 256. The housing also includes a mechanism, such as a band 260. As can be seen, the inflator is positioned within or upon the bracket or housing 256 and secured thereto by means of the fastenable band 260. As can be seen in FIG. 3 the inflator 250 appears to be shown as being used outside of the air bag 200. This has been done for ease of illustration and is not the case. The inflator 250 is positioned within the air bag 200 as also shown in FIG. 13. FIG. 13 is a side view of a section of the air bag 200 showing the inflator studs 258a–c extending through corresponding holes 304a in the rear panel of the air bag 200. A small reinforcement panel 259 can be sewn to the rear panel 202b to reinforce the bag proximate the location of the inflator 250. This panel 259 can be secured on the inside or outside of panel 202b. When located on the inside of the panel 202b the reinforcement panel 259 functions as a heat shield. The mounting studs 258a–c also extend through openings 310a in the reinforcement panel 259. The thickness of these panels has been exaggerated. The studs 258a–c are secured to the mounting plate 240 by nuts 300.

Figure 14:
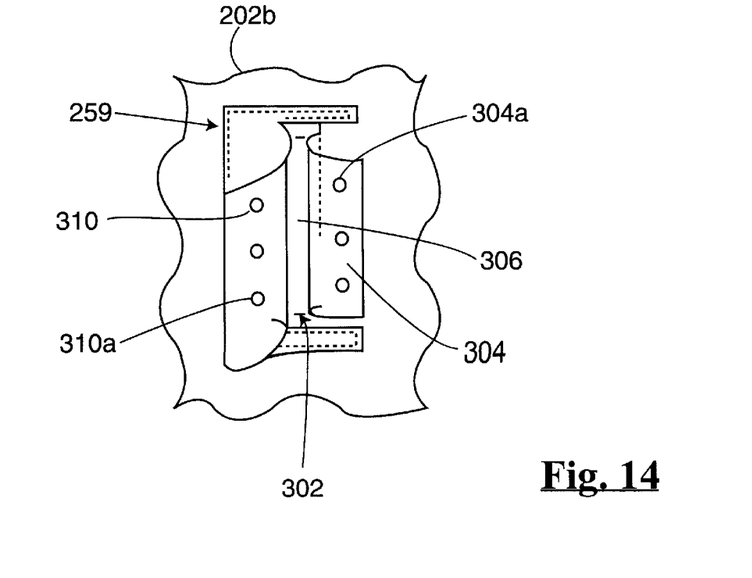
FIG. 14 is a partial plan view of a rear panel.

FIG. 14 is a partial plan view of the rear panel 202b and illustrates the method by which the inflator 250 is placed within the air bag 200. The rear panel 202*b* and reinforcement panel 259 are split, generally at 302, which forms a first flap 304 and a second flap 310 both of which are folded back to uncover an opening 306 in the panel 202*b*. The inflator 250 is placed inside the air bag 200 through opening 306. The flap 304 is manipulated so that its openings are placed about the mounting studs 258*a–c*. Thereafter the flap 310 is manipulated so its openings 310*a* are similarly received about the studs. In this configuration the opening 306 is effectively closed with the inflator 250 within the air bag 200.

The housing 100 is assembled as follows: the retainer plate 240 is positioned upon lugs 154*c* and d. When in position, the openings 242*a–c* are in alignment with the openings 160 of the back plate 152. The air bag 200, with the inflator 250 therein, is first folded to a generally rectangular configuration to fit within the cavity 172 (see FIG. 4). With inflator 250 in place (within the air bag 200), the left side 224 of the air bag and side 216*a* are folded or rolled inwardly toward the back plate 152. This folding or rolling results in a folded or rolled edge 226 which is arranged to lie generally parallel to the sidewall 151*a* of the trim panel 150. Similarly, the right-hand side 228 of the air bag is rolled or folded toward the mounting location of the inflator 250 into the configuration generally shown in FIG. 3. Thereafter, the mounting studs 258*a–c* of the inflator are passed through the openings 242*a–c* to position the inflator 250 against the mounting plate 240 trapping an adjacent portion of the air bag 200 (and reinforcing panel 259) therebetween. This construction acts as a seal to prevent gas leakage from the bag about the inflator. The inflator 250 is secured to the back plate 152 by a plurality of nuts 300. Further, the channel or opening 212 located within the air bag 200 is positioned about the sides 164 of the projection 162. With the air bag and inflator in place upon the back plate 152 the trim panel 150 is positioned thereon.

After the D-ring 60, tongue 65 and anchor bracket 69 (see FIG. 7) have been passed through the assembled housing 100, the housing 100 is secured to the B-pillar and roof rail by fasteners 254 and positioned relative to the lower trim 63.

Upon the sensing of a side impact crash or rollover condition of the vehicle by an appropriate sensor or sensors located within the vehicle, an activation signal is communicated to the inflator 250 to inflate the air bag 200. As the air bag 200 inflates, it bears upon the inner surface of the trim panel 150 causing the trim panel to rupture along seam 170. The trim panel will divide into two halves or parts 150*a* and 150*b*, which pivot outwardly as the air bag 200 inflates. Upon inflation of the air bag, the housing parts 150*a* and 150*b* will be trapped between the air bag 200 and the side of the vehicle away from the occupant.

Figure 8:
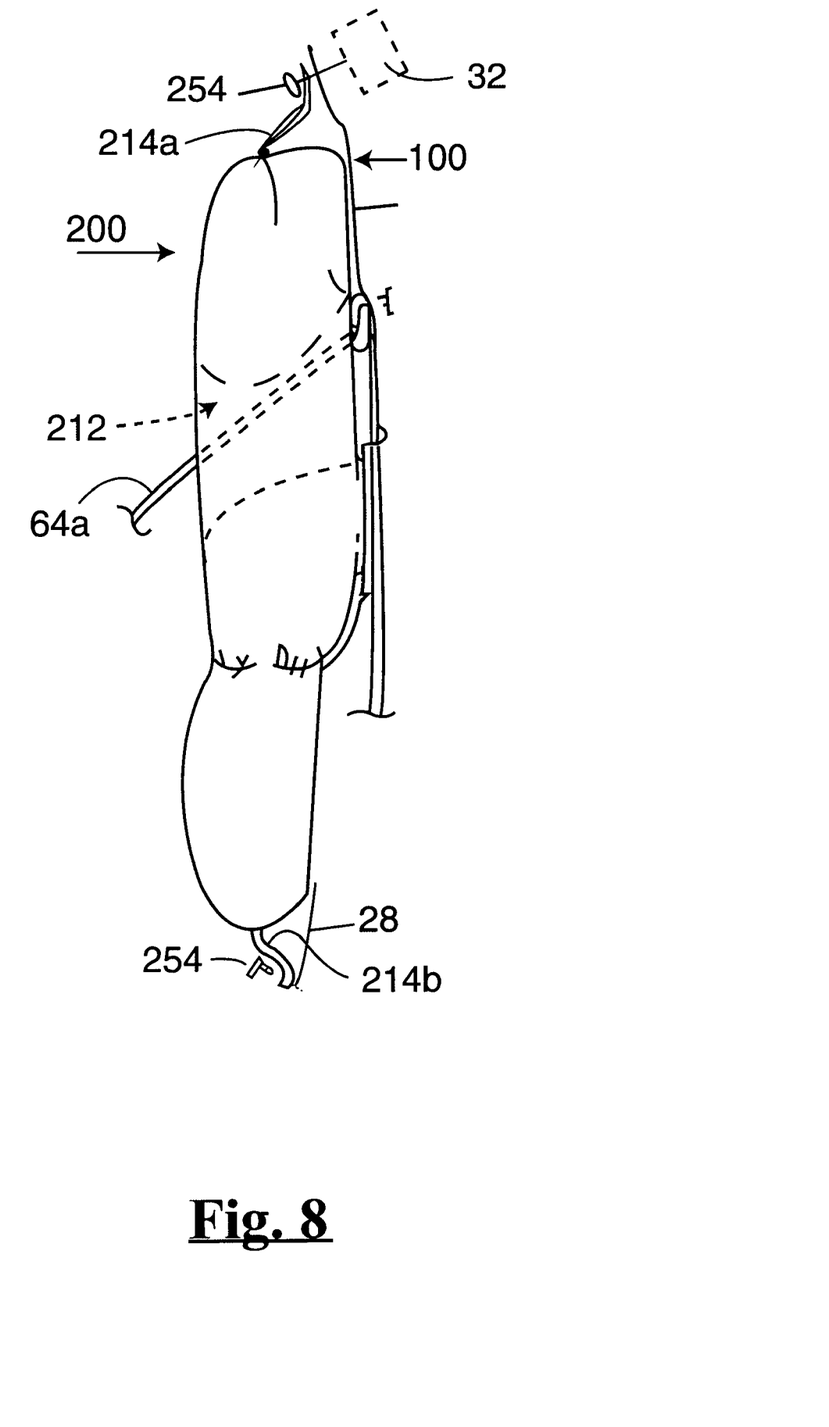
FIGS. 8 and 8a show various views of an inflated air bag.
Figure 8A:
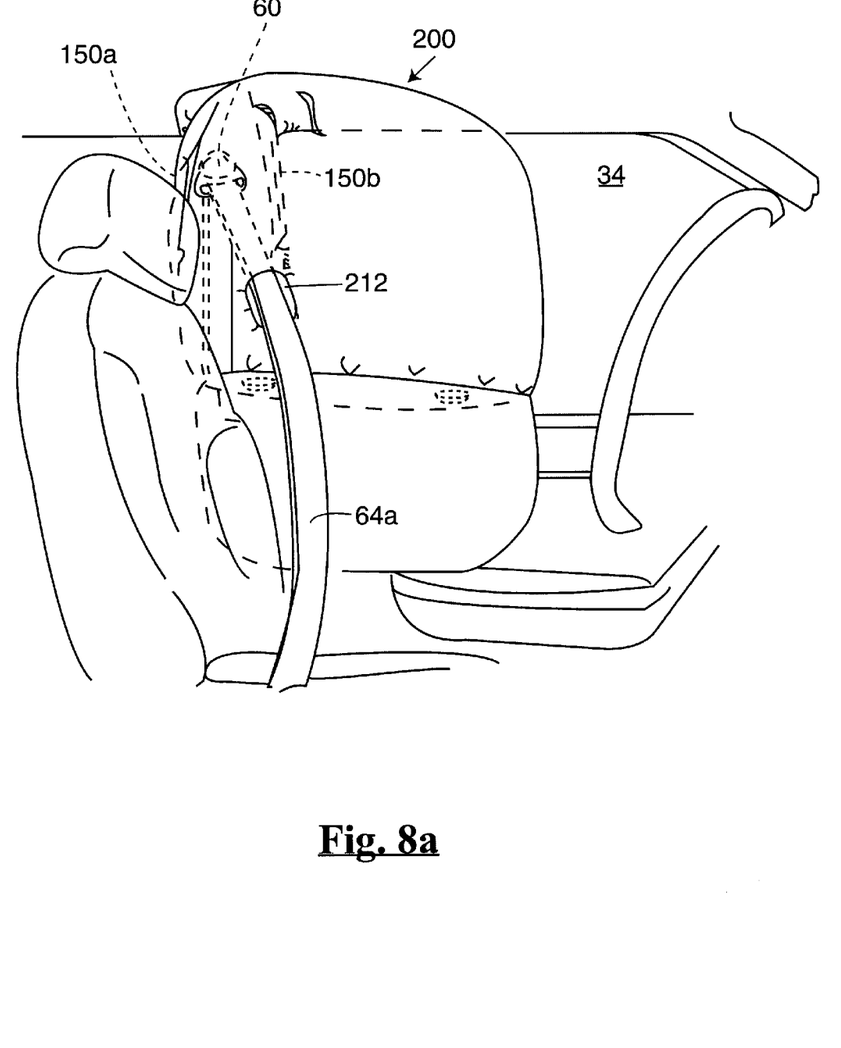

Reference is briefly made to FIGS. 8 and 8*a* which show views of the inflated air bag 200 adjacent the B-pillar 28. FIG. 8*a* also shows the shoulder belt 64*a* extending through the opening or channel 212 in the air bag. As the air bag inflates it lifts the shoulder belt portion 64*a* of the seat belt 64 upwardly and inwardly. This movement of the shoulder belt portion 64*a* creates a tension in the lap belt portion 64*b* (see FIG. 7) causing the lap belt portion 64*b* to slide within an aperture of the tongue 65 thereby eliminating slack in the seat belt about the occupant.

When inflated, as shown in FIG. 8*a*, the air bag 200 extends forwardly from the B-pillar blocking a portion of the front window 34 preventing egress of the occupant.

Figure 9:
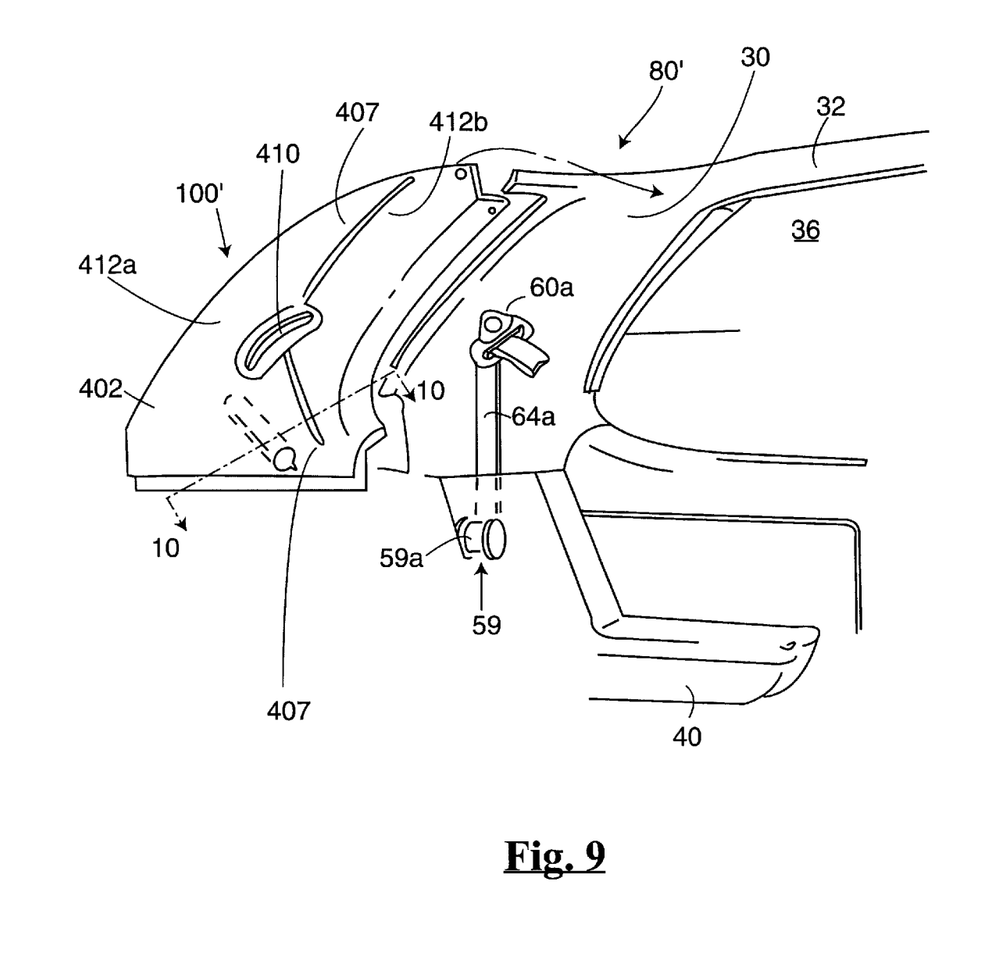
FIG. 9 shows an alternative restraint system in relation to the C-pillar of a vehicle.
Figure 10:
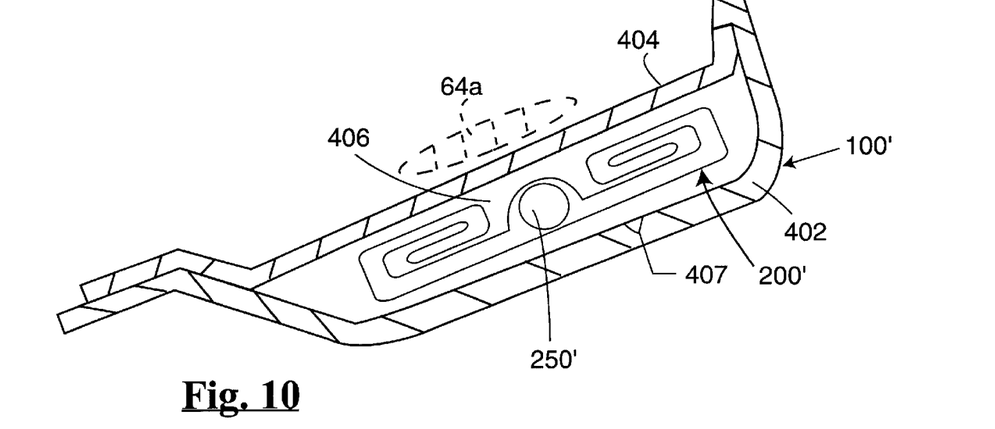
FIG. 10 is a cross sectional view of an alternate embodiment of the invention through sections line 10—10 of FIG. 9.
Figure 11:
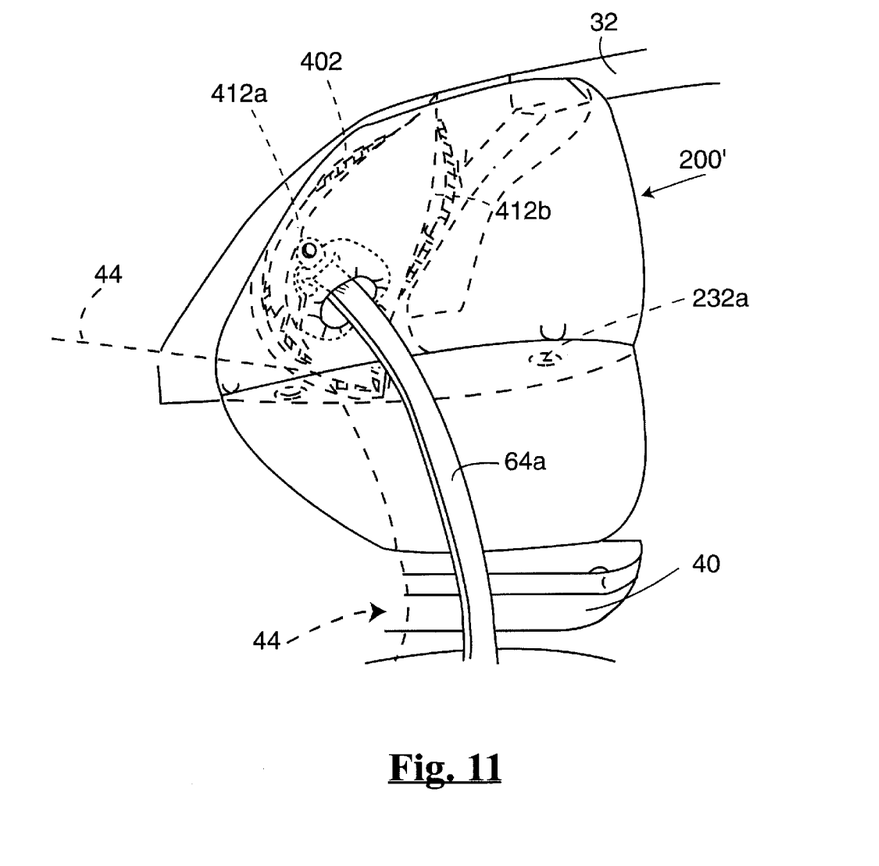
FIG. 11 shows an inflated air bag as it opens an associated cover.

Reference is now made to FIGS. 9 through 12 which illustrate a similar system 80' applied to the rear seating positions of the vehicle. FIG. 9 illustrates the rear interior portion of the vehicle, and more particularly the rear window 36, roof rail 32 and C-pillar 30. Additionally, FIG. 9 shows the general location of a rear seat belt retractor 59 having a length of seat belt wound about a spool 59*a* of the retractor. The shoulder belt portion 64*a* extends through a D-ring 60*a* which is secured to the vehicle frame at a fixed point.

The system 80' includes a rear housing 100' having a trim plate 402 and a rear or back plate 404 defining a space or channel 406 therebetween. An inflator 250' and air bag 200' are positioned within the channel 406. The air bag 200' is constructed to have a channel 212' therein (similar to channel 212 with air bag 200) through which the shoulder belt portion 64*a* extends. The inflator 250' is mounted to the air bag 200' in the manner as described above. The housing 100' and particularly the trim panel 402, includes a tear seam 407 (also shown in FIG. 10) which extends from a slot or opening 410.

With D-ring in place upon the C-pillar the belt and anchor are threaded through the opening 410 in a rear housing 100'. Subsequently, the assembled housing 100' is secured to the C-pillar.

Figure 12:
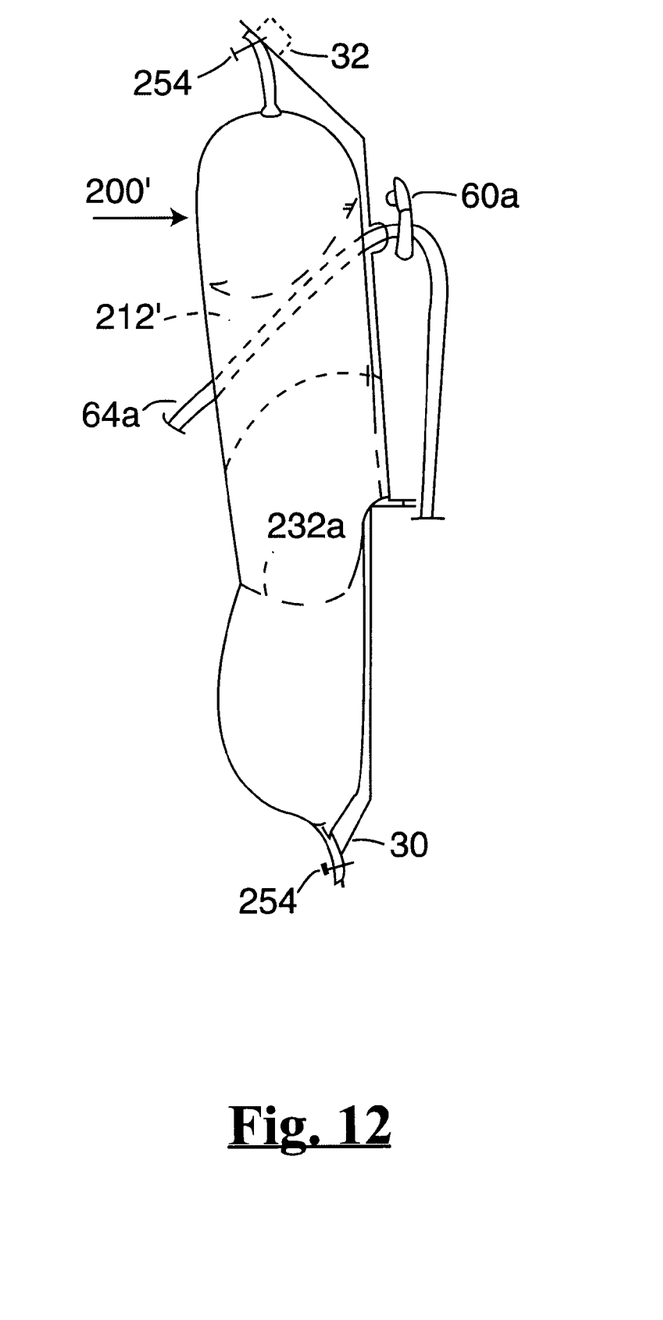
FIG. 12 shows an inflated air bag in relation to the side of a vehicle.

Reference is briefly made to FIG. 12 which shows the air bag 200' in its inflated state. As with the embodiment above, as the air bag 200' expands the trim panel 402 is opened along the tear seam 407. The resulting two halves 412*a* and 412*b* of the front panel trim rotate outwardly (as the air bag inflates) toward the side of the vehicle. Upon inflation of the air bag, these housing sides or parts 412*a* and b are positioned between the air bag and the vehicle side.

Many changes and modifications in the above-described embodiment of the invention can, of course, be carried out without departing from the scope thereof. Accordingly, that scope is intended to be limited only by the scope of the appended claims.

What is claimed is:

1. A side impact crash protection and rollover system (80) comprising:
    a web guide (60) attachable to a pillar of a vehicle;
    a seat belt system (50) having a shoulder belt portion (64*a*) supported by and extending from the web guide, the shoulder belt portion adapted to be secured about a seated occupant;
    an air bag assembly (100, 200, 250) including an air bag (200) initially stored in an uninflated or folded condition adjacent the web guide and when inflated is positioned adjacent the pillar (28, 30), the air bag including a tubular first channel (212) for receiving a portion of the shoulder belt portion.

2. The system as defined in claim 1 wherein the system further includes a housing (100) to protectively enclose the air bag, the housing adapted to be secured to the pillar, with the air bag folded therein.

3. The system as defined in claim 1 wherein upon inflation of the air bag, a portion of the inflated air bag immediately below the shoulder belt portion lifts the shoulder belt portion upwardly relative to the seated occupant to aid in tightening the seat belt system about the occupant.

4. The system as defined in claim 1 wherein the air bag comprises a plurality of panels joined together at a peripheral edge, each panel including an opening therein, a tube is joined to the panels at each opening defining the first channel.

5. The system as defined in claim 4 wherein the air bag is made from woven material.

6. The system as defined in claim 4 wherein the air bag panels are coated to reduce the permeability of the material.

7. The system as defined in claim 4 wherein the joined peripheral edge is heat sealed.

8. The system as defined in claim 4 wherein the air bag is made from a thermoplastic.

9. The system as defined in claim 4 wherein the air bag includes upper and lower chambers.

10. The system as defined in claim 9 wherein the first channel is located within the upper chamber.

11. A side impact crash protection and rollover system (80) comprising:

a web guide (60) attachable to a pillar of a vehicle;

a seat belt system (50) having a shoulder belt portion (64a) supported by and extending from the web guide, the shoulder belt portion adapted to be secured about a seated occupant;

an air bag assembly (100, 200, 250) including an air bag (200) initially stored in an uninflated or folded condition adjacent the web guide and when inflated is positioned adjacent the pillar (28, 30), the air bag including a first channel (212) for receiving a portion of the shoulder belt portion, a housing (100) to protectively enclose the air bag, the housing adapted to be secured to the pillar, with the air bag folded therein;

wherein the housing includes a housing opening (110, 410) adapted to be positioned in general in alignment with a first means (54, 67) for securing the web guide to the pillar, and a frangible portion (170, 407) extending from the housing opening which is opened by the inflating air bag to permit the air bag to extend beyond the housing to protect an occupant during the crash; the first channel, prior to inflation of the air bag, positioned generally about the housing opening interior to the housing.

12. The system as defined in claim 11 wherein upon the tearing open of the frangible portion (170, 407), the housing divides into two parts (150a,b; 412a,b), each of which is positioned between the inflated air bag and an adjacent part of the vehicle.

13. The system as defined in claim 12 wherein when the housing, with the air bag installed therein, is mounted proximate the pillar, the shoulder belt portion (64a) extends through the first channel and through the housing opening.

14. The system as defined in claim 11 wherein the web guide is positioned upon the outside of the housing and a means for mounting the web guide extends through the housing opening and first channel and is secured to the pillar.

15. The system as defined in claim 14 wherein the shoulder belt portion includes a first part and a second part, the first part extends from a seat belt retractor along the housing and is looped through the web guide; the second part extending from the web guide to a tongue, the seat belt system includes a lap belt portion which extends from the tongue to a first anchor point, the tongue lockable within a cooperating buckle forming a 3-point seat belt restraint;

wherein upon inflation of the air bag, the air bag raises the second part of the shoulder belt portion to reduce slack in the seat belt restraint, about the occupant.

16. The system as defined in claim 15 wherein upon inflation of the air bag and the raising of the shoulder belt portion, the lap belt portion is drawn more tightly about the occupant.

17. A side impact crash protection and rollover system comprising:

a housing including a frangible portion and a first opening through which a portion of a seat belt extends;

a cushion inflatable from an uninflated, stored condition to an inflated condition, wherein when in the uninflated condition, the cushion is stored within the housing and upon inflation, the cushion causes the frangible portion of the housing to break creating an opening in the housing through which the cushion can continue to inflate;

the cushion including at least a first inflatable section having a tubular portion formed into an aperture, wherein when the cushion is within the housing in its uninflated, stored condition, the aperture is aligned with the first opening of the housing, such that the seat belt extends therethrough, wherein upon deployment of the cushion, the first inflatable section is positioned generally proximate a pillar of a vehicle at a location to protect the head and shoulder of an occupant in a collision.

18. The system as defined in claim 17 wherein the cushion further includes an inflatable second or lower section in fluid communication with the first section such that inflation gas flows therebetween, wherein upon deployment of the cushion, the second section is located generally below the first section at a location to protect the thorax area of the occupant.

* * * * *